(12) United States Patent
Rumreich

(10) Patent No.: US 7,545,937 B2
(45) Date of Patent: Jun. 9, 2009

(54) CHROMINANCE PROCESSING ARRANGEMENT HAVING IMMUNITY TO COLORSTRIPE ENCODING

(75) Inventor: Mark Francis Rumreich, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 689 days.

(21) Appl. No.: 10/164,683

(22) Filed: Jun. 7, 2002

(65) Prior Publication Data

US 2003/0108201 A1    Jun. 12, 2003

Related U.S. Application Data

(60) Provisional application No. 60/341,115, filed on Dec. 12, 2001.

(51) Int. Cl.
| | |
|---|---|
| H04N 7/167 | (2006.01) |
| H04N 9/45 | (2006.01) |
| H04N 5/46 | (2006.01) |
| H03L 7/00 | (2006.01) |

(52) U.S. Cl. .................. 380/213; 348/507; 348/566; 331/17

(58) Field of Classification Search ........... 380/213, 380/200, 222, 235; 348/645, 507, 506, 566; 331/17
See application file for complete search history.

(56) References Cited

U.S. PATENT DOCUMENTS

| | | | | |
|---|---|---|---|---|
| 3,578,902 A | * | 5/1971 | Monsay ..................... 386/16 |
| 3,763,439 A | | 10/1973 | Peil | |
| 3,806,634 A | | 4/1974 | Abbott et al. | |
| 4,122,487 A | * | 10/1978 | Beaulier et al. ............. 348/539 |
| 4,183,047 A | * | 1/1980 | Kim et al. ................... 348/648 |
| 4,292,648 A | * | 9/1981 | Kowal ........................ 386/10 |
| 4,375,099 A | * | 2/1983 | Waters et al. ............... 714/709 |
| 4,623,915 A | * | 11/1986 | Bolger ........................ 348/566 |
| 4,742,544 A | * | 5/1988 | Kupnicki et al. ............ 380/215 |
| 4,797,730 A | * | 1/1989 | Smith ......................... 348/539 |
| 4,989,073 A | * | 1/1991 | Wagner ...................... 348/498 |
| 5,012,327 A | * | 4/1991 | Bishop ........................ 348/527 |
| 5,060,262 A | * | 10/1991 | Bevins et al. ............... 380/226 |
| 5,355,172 A | * | 10/1994 | Adams et al. ............... 348/505 |
| 5,459,524 A | * | 10/1995 | Cooper ....................... 348/507 |
| 5,539,357 A | * | 7/1996 | Rumreich ................... 331/17 |
| 5,822,011 A | * | 10/1998 | Rumreich ................... 348/549 |
| 5,831,680 A | * | 11/1998 | Azuma et al. .............. 348/506 |
| 5,907,369 A | * | 5/1999 | Rumreich et al. .......... 348/566 |
| 5,917,550 A | * | 6/1999 | Kim .......................... 348/536 |
| 6,038,267 A | * | 3/2000 | Oura et al. ................. 375/329 |

FOREIGN PATENT DOCUMENTS

| | | | | |
|---|---|---|---|---|
| JP | 59147590 A | * | 8/1984 |
| JP | 01303982 A | * | 12/1989 |
| JP | 08140059 A | * | 5/1996 |

(Continued)

Primary Examiner—Emmanuel L Moise
Assistant Examiner—Techane J. Gergiso
(74) Attorney, Agent, or Firm—Robert D. Shedd; Brian J. Cromarty

(57) ABSTRACT

A video system (100) includes a chrominance processing arrangement (200). The chrominance processing arrangement (200) includes a burst accumulator (240) operative to detect a polarity inversion within a burst interval associated with a horizontal line of video information, and generate at least one output signal that compensates for the detected polarity inversion.

8 Claims, 4 Drawing Sheets

FOREIGN PATENT DOCUMENTS

| | | | |
|---|---|---|---|
| JP | 08251618 A | * | 9/1996 |
| JP | 9-331547 | | 12/1997 |
| JP | 09331547 A | * | 12/1997 |
| JP | 10-276447 | | 10/1998 |
| JP | 11266282 A | * | 9/1999 |
| JP | 11-355796 | | 12/1999 |
| JP | 2000324364 A | * | 11/2000 |

* cited by examiner

CHROMINANCE PROCESSING ARRANGEMENT HAVING IMMUNITY TO COLORSTRIPE ENCODING

This application claims priority to and all benefits accruing from a provisional application filed in the United States Patent and Trademark Office on Dec. 12, 2001, and there assigned Ser. No. 60/341,115.

BACKGROUND OF THE INVENTION

1. Field of the Invention

The present invention generally relates to video systems, and more particularly, to a chrominance processing arrangement for use in video systems that provides, among other things, immunity to colorstripe encoding.

2. Background Information

Techniques such as colorstripe encoding are often utilized to discourage the unauthorized reproduction of video recordings by degrading the quality of the resultant copies. Although colorstripe encoding is not intended to degrade playback of authorized video recordings, some picture degradation typically occurs. Colorstripe encoding software is commercially available from companies, such as Macrovision.

Colorstripe encoding generally involves inverting the polarity of a portion of the colorburst (i.e., "burst") interval associated with a horizontal line of video information. Such encoding may be applied to a given number of horizontal lines that comprise a video frame. For example, colorstripe encoding may be applied to 4 out of every 20 lines, or to 2 out of every 17 lines, etc. The polarity inversion of colorstripe encoding causes the gain of automatic color control ("ACC") circuitry of a video system to be modulated, thus resulting in horizontal stripes of oversaturated chrominance on the display.

A traditional approach for reducing the visibility of artifacts associated with colorstripe encoding is to make the ACC time-constant sufficiently large so that the amplitude of the modulation is reduced. This approach, however, is not completely satisfactory since it does not completely eliminate the artifacts, but simply reduces their amplitude. Moreover, this approach necessitates an ACC time-constant that may be larger than is otherwise preferred for optimum signal acquisition behavior.

Another approach for reducing the visibility of artifacts associated with colorstripe encoding is to utilize a burst replacement technique. In general, burst replacement involves stripping colorstripe encoding from video information by removing a burst packet and replacing it with an artificially generated burst packet. Burst replacement, however, is not ideal since removal of an original burst packet may cause valuable information within that burst packet to be lost, and thereby create operational problems within a video system. For example, removal of an original burst packet may cause chrominance synchronization problems to occur.

Accordingly, there is a need for a chrominance processing arrangement that avoids the aforementioned problems, and thereby provides improved immunity to colorstripe encoding. The present invention addresses these and other issues.

SUMMARY OF THE INVENTION

In accordance with the present invention, a video system includes a chrominance processing arrangement. The chrominance processing arrangement includes means for detecting a polarity inversion within a burst interval associated with a horizontal line of video information, and for generating at least one output signal that compensates for the detected polarity inversion.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
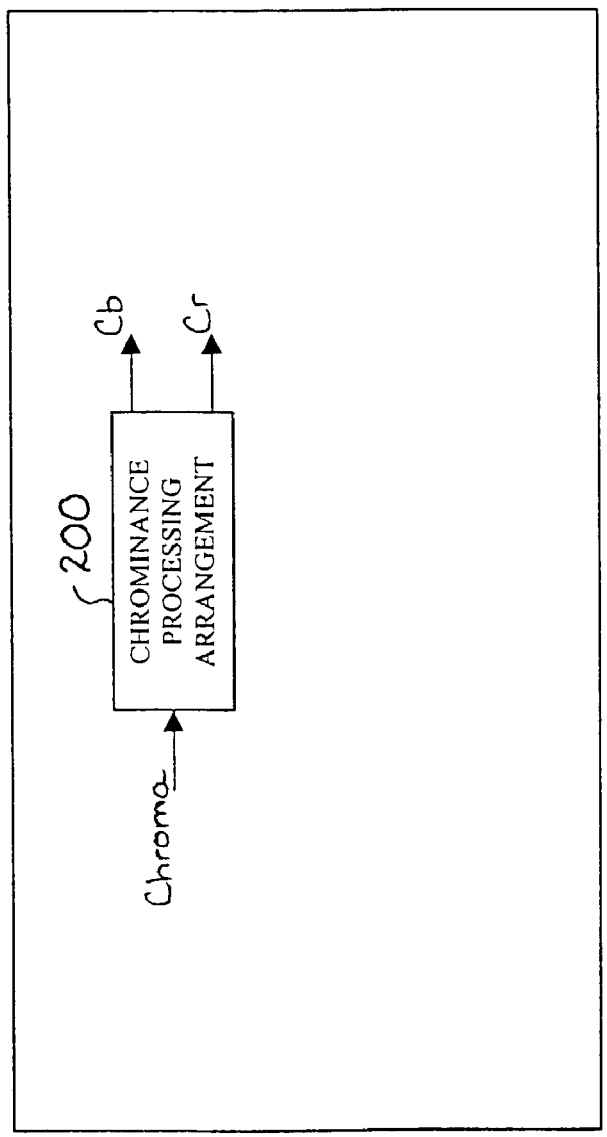
FIG. 1 is a diagram of an exemplary video system including a chrominance processing arrangement according to principles of the present invention.

Referring now to the drawings, and more particularly to FIG. 1, a diagram of an exemplary video system 100 including a chrominance processing arrangement 200 according to principles of the present invention is shown. Video system 100 of FIG. 1 may be embodied, for example, as a television signal receiver, a set-top box, a video cassette recorder ("VCR"), a digital versatile disk ("DVD") player, a video game box, a personal video recorder ("PVR") or any other system having a video processing function.

In FIG. 1, video system 100 includes chrominance processing arrangement 200 for receiving and processing a modulated chrominance subcarrier input signal ("Chroma"), to thereby generate and output baseband chrominance signals ("Cr" and "Cb"). According to an exemplary embodiment, the Cb and Cr signals may represent demodulated chrominance signals such as B-Y and R-Y color difference signals, as used in video systems such as television signal receivers or other systems. Chrominance processing arrangement 200 may, for example, be included on one or more integrated circuits ("ICs"). Although not expressly shown in FIG. 1, video system 100 may also include other components, such as other ICs and other electrical and non-electrical components. As will be explained herein, chrominance processing arrangement 200 provides video system 100 with immunity to colorstripe encoding.

Figure 2:
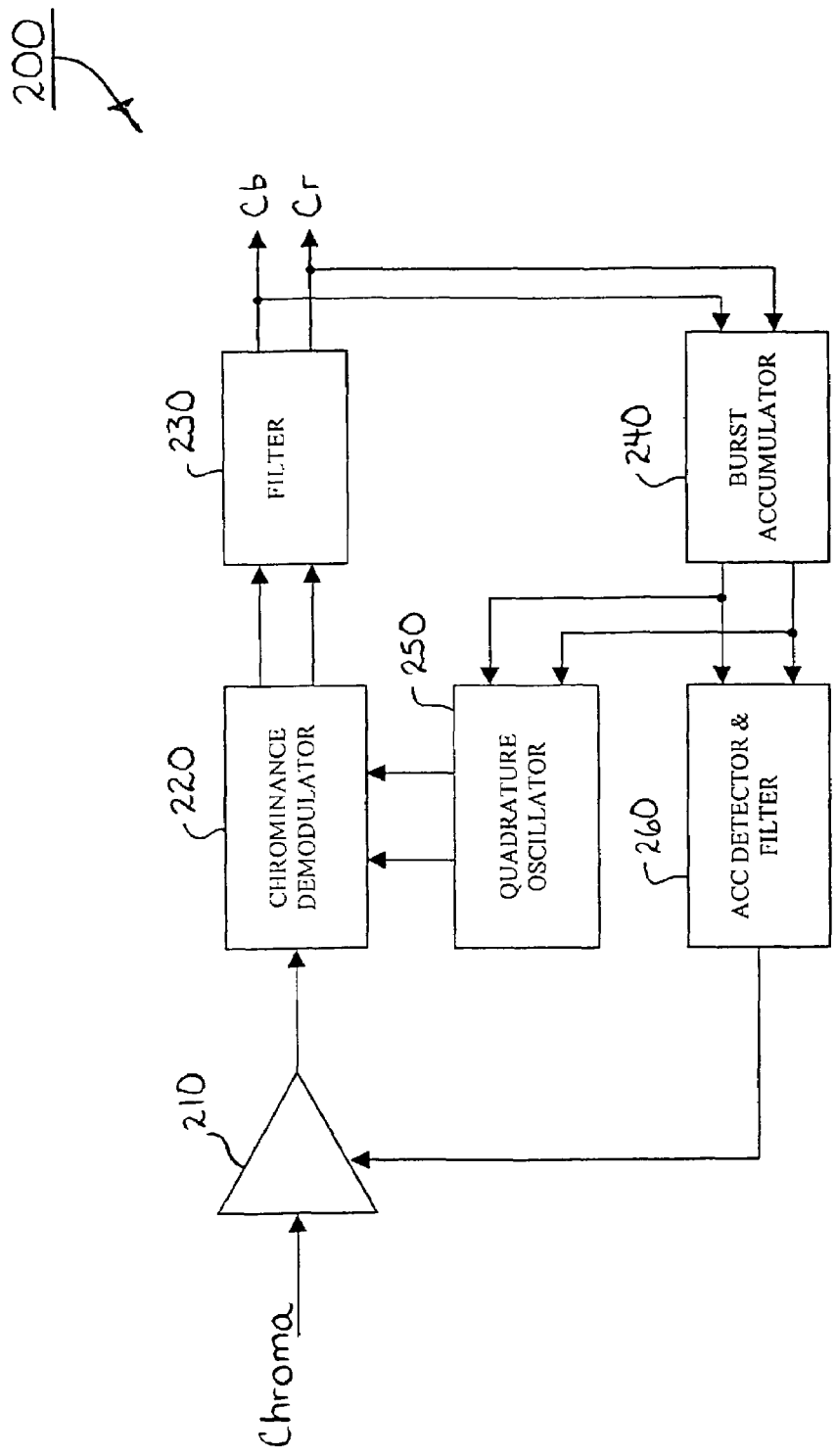
FIG. 2 is a diagram providing further exemplary details of the chrominance processing arrangement of FIG. 1.

Referring to FIG. 2, a diagram providing further exemplary details of chrominance processing arrangement 200 of FIG. 1 is shown. In FIG. 2, chrominance processing arrangement 200 comprises a variable-gain amplifier 210, a chrominance demodulator 220, a filter 230, a burst accumulator 240, a quadrature oscillator 250, and an ACC detector and filter 260.

According to an exemplary mode of operation, amplifier 210 receives a modulated chrominance input signal ("Chroma") having a nominal subcarrier frequency of 3.58 MHz. Amplifier 210 adjusts the gain (e.g., amplitude) of the modulated chrominance input signal to thereby generate and output a gain-adjusted chrominance signal. Chrominance demodulator 220 receives the gain-adjusted chrominance signal from amplifier 210 and, according to an exemplary embodiment, multiplies the gain-adjusted chrominance signal by quadrature phase sinusoid signals provided from quadrature oscillator 250 to thereby generate and output demodulated chrominance signals.

Filter 230 performs a filtering operation (e.g., low pass filtering operation) upon the demodulated chrominance signals generated by chrominance demodulator 220 to thereby generate and output baseband Cb and Cr signals. As previously indicated herein, the baseband Cb and Cr signals may represent demodulated chrominance signals such as B-Y and R-Y color difference signals, as used for example in television signal receivers or other systems.

Burst accumulator 240 receives and samples the baseband Cb and Cr signals output from filter 230 to thereby generate output signals representative of the average Cb and Cr amplitude values for each burst interval. There is one such burst interval associated with each horizontal line of video information. According to an exemplary embodiment, burst accumulator 240 takes thirty-two (i.e., 32) amplitude samples of each of the baseband Cb and Cr signals during a burst interval, and averages these amplitude samples to thereby generate average Cb and Cr amplitude values for the burst interval. A different number of samples may, of course, be taken in accordance with the present invention. Burst accumulator 240 provides output signals representative of the average Cb and Cr amplitude values for the burst interval to quadrature oscillator 250 and ACC detector and filter 260, to thereby control their respective operations. For example, quadrature oscillator 250 uses the output signals from burst accumulator 240 to control its oscillation phase, and thereby control the phase of the sinusoidal signals provided to chrominance demodulator 220. According to an exemplary embodiment, ACC detector and filter 260 includes amplitude detection and filtering circuitry, and uses the output signals from burst accumulator 240 to generate and output a control signal that controls the amplitude gain of amplifier 210.

In FIG. 2, colorstripe encoding introduces errors into the output signals of burst accumulator 240. In particular, the average Cb amplitude value generated by burst accumulator 240 is especially susceptible to errors due to the polarity inversion introduced through the colorstripe encoding process. For example, without colorstripe encoding, the baseband Cb signal may normally exhibit a constant amplitude value of −448 during a burst interval when video system 100 is in a steady-state condition (e.g., not during a signal acquisition state such as following a channel change). Accordingly, the average Cb amplitude value is −448 during this burst interval. However, when colorstripe encoding is present, a portion of the burst interval is subject to a polarity inversion that causes the average Cb amplitude value to change. For example, if colorstripe encoding is applied to one-fourth of a burst interval, then one-fourth of the samples taken during this burst interval have inverted polarities. That is, assuming 32 samples per burst interval, and a normal average Cb amplitude value of −448, the average Cb amplitude value for the burst interval having colorstripe encoding is:

$$[(8)(448)+(24)(-448)]/[32]=-224$$

As indicated in the foregoing equation, when colorstripe encoding is applied to one-fourth of a burst interval, one-fourth of the samples (i.e., 8 out of 32) taken during this burst interval have inverted polarity and thereby cause the average Cb amplitude value to differ from its normal value of −448.

According to an exemplary embodiment, the baseband Cr signal may normally exhibit a constant amplitude value of zero (i.e., 0) during a burst interval when video system 100 is in a steady-state condition. Accordingly, during a steady-state condition of video system 100, the average Cr amplitude value is not particularly susceptible to errors due to the polarity inversion introduced through colorstripe encoding, since the inverse of 0 is 0. However, the average Cr amplitude value is not typically 0 during a signal acquisition state, such as following a channel change. Accordingly, when video system 100 is in a signal acquisition state, the average Cr amplitude value is likewise susceptible to errors due to the polarity inversion introduced through colorstripe encoding.

Errors in the output signals of burst accumulator 240 may be addressed by simply increasing the time constant in ACC detector and filter 260, and thereby "smoothing" the errors and making them less visible. However, even with the use of a relatively large time constant, some artifacts are still visible with certain video material. Even with perfect smoothing, a less than desirable amount of chrominance oversaturation (e.g., up to 13 percent) may occur. As will be explained herein, the present invention addresses these problems by canceling errors attributable to colorstripe encoding in the output signals of burst accumulator 240, prior to any filtering by ACC detector and filter 260.

Figure 3:
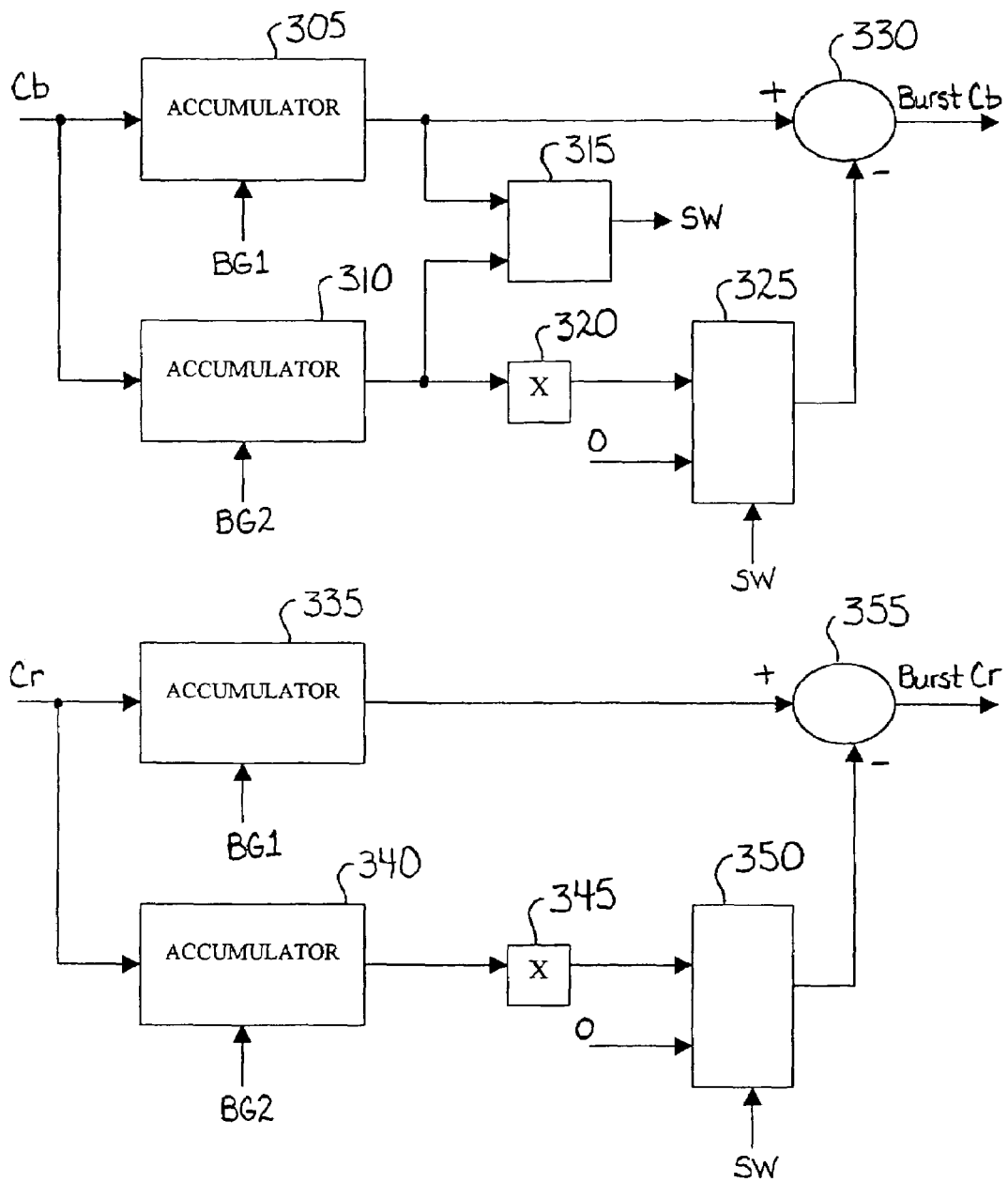
FIG. 3 is a diagram providing further exemplary details of the burst accumulator of FIG. 2.

Referring now to FIG. 3, a diagram providing further exemplary details of burst accumulator 240 of FIG. 2 is shown. As indicated in FIG. 3, burst accumulator 240 includes components for processing the baseband Cb signal, and components for processing the baseband Cr signal. In particular, the components for processing the baseband Cb signal include accumulators 305 and 310, a sign comparator 315, a multiplier 320, a multiplexer 325, and a subtractor 330. The components for processing the baseband Cr signal include accumulators 335 and 340, a multiplier 345, a multiplexer 350, and a subtractor 355.

According to an exemplary mode of operation, accumulators 305 and 310 receive and sample the baseband Cb signal to thereby generate accumulated Cb amplitude values in accordance with enabling burst gate ("BG") signals BG1 and BG2, respectively. In particular, the BG1 and BG2 signals are activated to respectively enable accumulators 305 and 310 to sample the baseband Cb signal and generate accumulated Cb amplitude values. The BG1 and BG2 signals may, for example, be generated by a processor or other device (not shown) of video system 100.

According to an exemplary embodiment, the BG1 signal has a pulse width duration that is equal to, or approximately equal to, the duration of a burst interval, which is typically about 1.78 milliseconds. For example, the pulse width duration of the BG1 signal may be slightly longer than, or shorter than, the duration of a burst interval. Moreover, the BG1 signal is activated to coincide with each burst interval. In this manner, the activated BG1 signal enables accumulator 305 to sample the baseband Cb signal and generate accumulated Cb amplitude values during each burst interval.

According to an exemplary embodiment, the BG2 signal has a pulse width duration that is less than the duration of the burst interval. For example, the pulse width duration of the BG2 signal may be equal to one-fourth the duration of a burst interval, or some other fractional portion thereof. In particular, the pulse width duration of the BG2 signal preferably corresponds to the portion of the burst interval where colorstripe encoding is expected to be present. Accordingly, if colorstripe encoding is present during the initial one-fourth of the burst interval, then the BG2 signal has a pulse width duration equal to one-fourth the duration of the burst interval. Moreover, the BG2 signal is activated during this portion of the burst interval where colorstripe encoding is present. In this manner, the activated BG2 signal enables accumulator 310 to sample the baseband Cb signal and generate accumulated Cb amplitude values during the portion of each burst interval where colorstripe encoding is expected to be present.

Sign comparator 315 receives the accumulated Cb amplitude values generated by accumulators 305 and 310, and performs a sign comparison operation thereon. In particular, sign comparator 315 determines whether the sign of the accumulated Cb amplitude value generated by accumulator 305 is the same as the sign of the accumulated Cb amplitude value generated by accumulator 310. That is, sign comparator 315 determines whether the accumulated Cb amplitude values are both positive (+) or both negative (−). In the event that the accumulated Cb amplitude values are different (i.e., one being positive and the other negative), then sign comparator 315 generates a switching ("SW") signal in a predetermined logic state that controls the switching state of multiplexer 325. As will be explained later herein, the accumulated Cb amplitude values have different signs when colorstripe encoding is present within a given burst interval, and have the same sign when colorstripe encoding is not present within a given burst interval.

Multiplier 320 receives the accumulated Cb amplitude value generated by accumulator 310, and multiplies the same by a predetermined value to generate a multiplied value. Multiplier 320 further generates an output signal representative of the multiplied value. According to an exemplary embodiment, the predetermined value utilized by multiplier 320 is two (i.e., 2). As will be illustrated later herein, this value of 2 enables any error to be cancelled and corrected.

Multiplexer 325 receives the output signal generated by multiplier 320, and also receives an input signal having a value of 0. This input signal to multiplexer 325 may, for example, be generated by a processor or other device (not shown) of video system 100. Multiplexer 325 is switched in dependence upon the SW signal generated by sign comparator 315 so as to selectively output either the output signal of multiplier 320, or the input signal having a value of 0. According to an exemplary embodiment, multiplexer 325 outputs the output signal of multiplier 320 when the SW signal is in one logic state (e.g., logic high), and outputs the input signal having a value of 0 when the SW signal is in the other logic state (e.g., logic low).

Subtractor 330 receives the accumulated Cb amplitude value generated by accumulator 305, and subtracts therefrom the value represented by the output of multiplexer 325 to thereby generate a burst signal ("Burst Cb"). In this manner, subtractor 330 subtracts either a value of 0 or the multiplied value of multiplier 320 from the accumulated Cb amplitude value of accumulator 305. As will be explained later herein, subtractor 330 subtracts the multiplied value of multiplier 320 from the accumulated Cb amplitude value of accumulator 305 when colorstripe encoding is present within a given burst interval. Conversely, subtractor 330 subtracts a value of 0 from the accumulated Cb amplitude value of accumulator 305 when colorstripe encoding is not present within a given burst interval. The burst signal generated by subtractor 330 is then normalized (by circuitry not shown in FIG. 3) to generate the output signal of burst accumulator 240 which represents the average Cb amplitude value for the given burst interval. For example, this average Cb amplitude value may be generated by dividing the value represented by the burst signal by the number of samples taken within the burst interval.

The components of burst accumulator 240 for processing the baseband Cr signal are substantially identical in structure and function to certain components for processing the baseband Cb signal. In particular, accumulators 335 and 340 are substantially identical to accumulators 305 and 310, respectively. Moreover, multiplier 345 is substantially identical to multiplier 320, multiplexer 350 is substantially identical to multiplexer 325, and subtractor 355 is substantially identical to subtractor 330. Accordingly, for clarity of explanation, these identical components will not be described again except where applicable. Note, however, that the components of burst accumulator 240 for processing the baseband Cr signal do not include a sign comparator since the SW signal generated by sign comparator 315 is used to control the switching state of multiplexer 350.

For a better understanding of the present invention, a more detailed explanation of burst accumulator 240 will now be provided with reference to FIG. 3. In particular, the following explanation describes an exemplary operation in which burst accumulator 240 detects colorstripe encoding within a burst interval associated with a horizontal line of video information, and compensates for such encoding in its output signals so as to provide improved chrominance processing in video system 100. The following explanation is intended as an example only, and does not limit the present invention in any manner. In the following example, assume: (i) that colorstripe encoding is present in the initial one-fourth of a burst interval, and (ii) that 32 samples are normally taken during a burst interval.

Accumulators 305 and 310 receive and sample the baseband Cb signal to thereby generate accumulated Cb amplitude values in accordance with the enabling BG1 and BG2 signals, respectively. Accordingly, accumulator 305 generates an accumulated Cb amplitude value for the entire burst interval (or at least most of the burst interval) while accumulator 310 generates an accumulated Cb amplitude value for the portion of the burst interval where colorstripe encoding is expected to be present (i.e., the initial one-fourth of the burst interval). In this manner, accumulator 305 takes 32 samples of the baseband Cb signal, while accumulator 310 takes 8 samples of the baseband Cb signal. Since colorstripe encoding is present in the initial one-fourth of the burst interval, the first 8 samples taken by accumulator 305 and all 8 samples taken by accumulator 310 have inverted polarities.

Assuming a normal baseband Cb value of −448, the accumulated Cb amplitude value generated by accumulator 305 is:

(8)(448)+(24)(−448)=−7,168

Note that without colorstripe encoding, the accumulated Cb amplitude value generated by accumulator 305 would be:

(32)(−448)=−14,336

The accumulated Cb amplitude value generated by accumulator 310 is:

(8)(448)=3,584

The accumulated Cb amplitude values generated by accumulators 305 and 310 (i.e., −7,168 and 3,584) are provided to sign comparator 315 which compares the signs of the two values and determines them to be different. As a result of this sign difference, sign comparator 315 generates the SW signal.

The accumulated Cb amplitude value generated by accumulator 310 is also provided to multiplier 320 which multiplies the accumulated Cb amplitude value by 2 to generate an output signal having a value of:

(2)(3,584)=7,168

Multiplexer 325 receives the output signal generated by multiplier 320, and is switched in response to the SW signal generated by sign comparator 315 so as to pass the output signal of multiplier 320 to subtractor 330. Subtractor 330 receives the accumulated Cb amplitude value (i.e., −7,168) generated by accumulator 305, and subtracts therefrom the value represented by the output of multiplexer 325 to thereby generate the burst signal ("Burst Cb") having a value of:

(−7,168)−(7,168)=−14,336

Note that this value of −14,336 is the same value that accumulator 305 would have generated if colorstripe encoding was not present. The burst signal generated by subtractor 330 is then normalized (by circuitry not shown in FIG. 3) to generate the output signal of burst accumulator 240 which represents the average Cb amplitude value for the given burst interval. In particular, the average Cb amplitude value for the burst interval is:

(−14,336)/(32)=−448

The baseband Cr signal is processed in a similar manner to the baseband Cb signal, as described above, to generate a burst signal ("Burst Cr"). This burst signal is likewise normalized (by circuitry not shown in FIG. 3) to generate the output signal of burst accumulator 240 which represents the average Cr amplitude value for the given burst interval. As previously indicated herein, the baseband Cr signal may normally exhibit a constant amplitude value of 0 during a burst interval when video system 100 is in a steady-state condition. Accordingly, during a steady-state condition of video system 100, the average Cr amplitude value is not particularly susceptible to errors due to the polarity inversion introduced through colorstripe encoding since the inverse of 0 is 0. However, the average Cr amplitude value is not typically 0 during a signal acquisition state, such as following a channel change. Accordingly, when video system 100 is in a signal acquisition state, the average Cr amplitude value is susceptible to errors due to colorstripe encoding, and such errors are corrected by the Cr signal processing components of burst accumulator 240 shown in FIG. 3.

Figure 4:
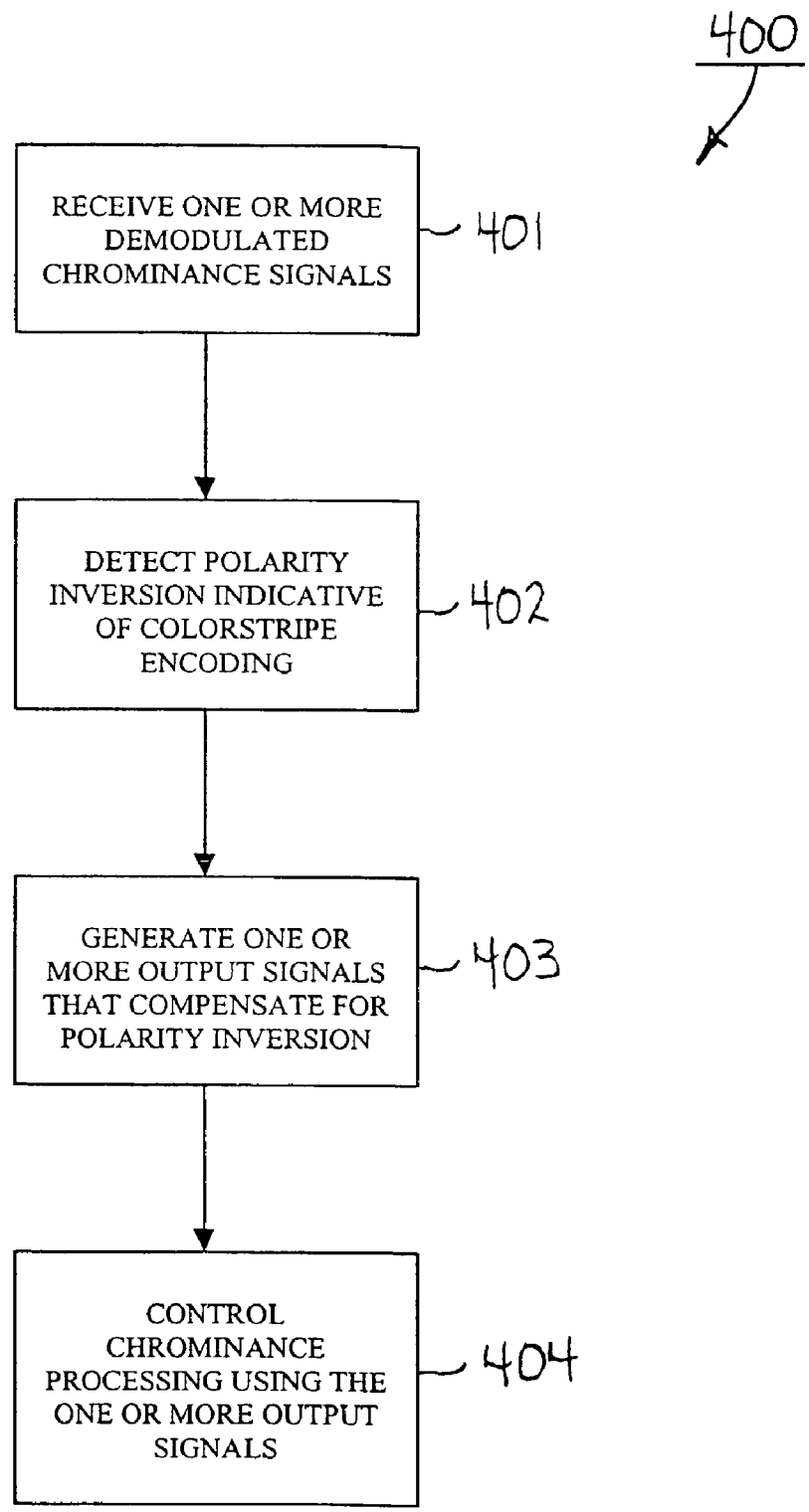
FIG. 4 is a flowchart summarizing exemplary steps for carrying out the present invention.

Referring to FIG. 4, a flowchart 400 summarizing exemplary steps for carrying out the present invention is shown. For purposes of example and explanation, the steps of FIG. 4 will be described with reference to chrominance processing arrangement 200 of FIG. 3. Note that the steps of FIG. 4 are merely exemplary, and do not limit the present invention in any manner.

In FIG. 4, process flow begins at step 401 where burst accumulator 240 receives one or more demodulated chrominance signals, such as the baseband Cb and Cr signals provided from filter 230. At step 402, burst accumulator 240 processes the one or more demodulated chrominance signals so as to detect a polarity inversion within a burst interval associated with a horizontal line of video information. As previously indicated herein, a detected polarity inversion indicates that colorstripe encoding is present within the given line. Next, at step 403, burst accumulator 240 generates one or more output signals that compensate for the polarity inversion detected at step 402. As previously described herein, burst accumulator 240 performs such compensation by canceling the errors in its output signals introduced by the polarity inversion. Then, at step 404, the one or more output signals from burst accumulator 240 are used to control chrominance processing. For example, quadrature oscillator 250 uses the one or more output signals from burst accumulator 240 to control its oscillation phase, and thereby control the phase of the sinusoidal signals provided to chrominance demodulator 220. Moreover, ACC detector and filter 260 uses the one or more output signals from burst accumulator 240 to generate and output a control signal that controls the amplitude gain of amplifier 210.

As described herein, the present invention advantageously provides artifact-free demodulated chrominance in a video system. The present invention described herein is particularly applicable to various video systems, either with or without display devices. Accordingly, the phrase "video system" as used herein are intended to encompass various types of systems or apparatuses including, but not limited to, television sets or monitors that include a display device, and systems or apparatuses such as a set-top box, VCR, DVD player, video game box, PVR or other video system that may not include a display device.

While this invention has been described as having a preferred design, the present invention can be further modified within the spirit and scope of this disclosure. For example, while a preferred embodiment of the present invention uses a burst accumulator to detect a polarity inversion within a burst interval and generate a compensating output signal, it will be intuitive to those skilled in the art that devices other than a burst accumulator may be used to perform these functions. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A video system, comprising:
a chrominance processing arrangement, including:
a burst accumulator detecting a polarity inversion within a burst interval associated with a horizontal line of video information, and generate at least one output signal that compensates for the detected polarity inversions;
a color control circuitry, wherein the at least one output signal of the burst accumulator controls the color control circuitry;
an oscillator, wherein the at least one output signal of the burst accumulator controls the oscillator;
an amplifier amplifying an input chrominance signal and generate a gain-adjusted chrominance signal, wherein the color control circuitry generates a control signal to control the amplifier; and
a chrominance demodulator processing the gain-adjusted chrominance signal and generating at least one demodulated chrominance signal.

2. The video system of claim 1, further comprising:
an oscillator generating phase signals; and
wherein the at least one output signal of the burst accumulator controls the oscillator, and the phase signals of the oscillator control the chrominance demodulator.

3. The video system of claim 1, wherein:
the burst accumulator comprises a plurality of accumulators for generating at least two values; and
the at least one output signal is generated in response to comparing signs of the at least two values.

4. A chrominance processing arrangement, comprising:
means for detecting a polarity inversion within a burst interval associated with a horizontal line of video information;
means for generating at least one output signal that compensates for the detected polarity inversion;
burst accumulating means for receiving and sampling said at least one demodulated chrominance signal;

color control means for enabling a color control operation, wherein the at least one output signal of the burst accumulating means controls the color control means;

oscillating means for generating phase signals, wherein the at least one output signal of the burst accumulating means controls the oscillating means;

amplifying means for amplifying an input chrominance signal to generate a gain-adjusted chrominance signal;

chrominance demodulating means for processing the gain-adjusted chrominance signal to generate at least one demodulated chrominance signal; and wherein the color control means generates a control signal to control the amplifying means.

5. The chrominance processing arrangement of claim 4, further comprising:

oscillating means for generating phase signals; and wherein the at least one output signal of the burst accumulating means controls the oscillating means, and the phase signals of the oscillating means control the chrominance demodulating means.

6. The chrominance processing arrangement of claim 4, wherein the means comprises a plurality of accumulators for generating at least two values; and the at least one output signal is generated in response to comparing signs of the at least two values.

7. A method for processing chrominance signals in a video system, comprising steps of:

detecting from the chrominance signals a polarity inversion within a burst interval associated with a horizontal line of video information; and generating at least one output signal that compensates for the detected polarity inversion, wherein the at least one output signal controls a color control circuitry of the video system, and an oscillator of the video system;

processing the gain-adjusted chrominance signal to generate at least one demodulated chrominance signal;

amplifying an input chrominance signal to generate a gain-adjusted chrominance signal; and generating a control signal via the color control circuitry to control amplification of the input chrominance signal.

8. The method of claim 7, further comprising steps of:

generating phase signals in dependence upon the at least one output signal; and controlling processing of the gain-adjusted chrominance signal in dependence upon the phase signals.

\* \* \* \* \*